United States Patent
Marcicki et al.

(10) Patent No.: US 10,164,303 B2
(45) Date of Patent: Dec. 25, 2018

(54) TRACTION BATTERY THERMAL MANAGEMENT SYSTEMS AND METHODS

(71) Applicant: FORD GLOBAL TECHNOLOGIES, LLC, Dearborn, MI (US)

(72) Inventors: James Matthew Marcicki, Livonia, MI (US); Thomas J. Coupar, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 435 days.

(21) Appl. No.: 14/882,643

(22) Filed: Oct. 14, 2015

(65) Prior Publication Data

US 2017/0110770 A1    Apr. 20, 2017

(51) Int. Cl.
| | |
|---|---|
| H01M 10/625 | (2014.01) |
| H01M 10/6556 | (2014.01) |
| H01M 10/635 | (2014.01) |
| B60K 7/00 | (2006.01) |
| B60K 11/02 | (2006.01) |
| B60L 11/18 | (2006.01) |

(52) U.S. Cl.
CPC ......... *H01M 10/625* (2015.04); *B60K 7/0007* (2013.01); *B60K 11/02* (2013.01); *B60L 11/1809* (2013.01); *H01M 10/635* (2015.04); *H01M 10/6556* (2015.04); *H01M 2220/20* (2013.01)

(58) Field of Classification Search
None
See application file for complete search history.

(56) References Cited

U.S. PATENT DOCUMENTS

| | | | |
|---|---|---|---|
| 5,620,057 A | | 4/1997 | Klemen et al. |
| 6,087,038 A | * | 7/2000 | Flament ............. H01M 2/1072 429/120 |
| 7,919,203 B2 | | 4/2011 | Shibuya et al. |
| 8,115,450 B2 | | 2/2012 | Ambrosio et al. |
| 8,367,233 B2 | | 2/2013 | Hermann et al. |
| 8,507,122 B2 | | 8/2013 | Saito et al. |
| 8,852,772 B2 | | 10/2014 | McDonald |
| 8,852,779 B2 | * | 10/2014 | Kim ..................... H01M 10/60 429/120 |

(Continued)

FOREIGN PATENT DOCUMENTS

| | | |
|---|---|---|
| CN | 202817141 U | 3/2013 |
| CN | 103253118 A | 8/2013 |

OTHER PUBLICATIONS

Ramotar, Lokendra, Second Law Analysis of a Liquid Cooled Battery Thermal Management System for Hybrid and Electric Vehicles, University of Ontario Institute of Technology, Aug. 2010.

*Primary Examiner* — Jonathan Crepeau
(74) *Attorney, Agent, or Firm* — James Dottavio; Brooks Kushman P.C.

(57) ABSTRACT

A battery thermal management system includes an inner housing containing a plurality of battery cells, and an outer housing enclosing the inner housing. A fluid channel is defined between an exterior surface of the inner housing and an interior surface of outer housing. The thermal management system also includes a fluid circulator in fluid flow communication with the fluid channel to selectively circulate one of a first thermal fluid and a second thermal fluid through the fluid channel.

19 Claims, 5 Drawing Sheets

(56) References Cited

U.S. PATENT DOCUMENTS

| | | | |
|---|---|---|---|
| 2009/0233158 A1* | 9/2009 | Kimura | H01G 9/0003 429/62 |
| 2012/0156541 A1* | 6/2012 | Sohn | H01M 10/0525 429/120 |
| 2012/0301755 A1* | 11/2012 | Axelsson | B60K 6/48 429/62 |
| 2014/0193683 A1 | 7/2014 | Mardall et al. | |

* cited by examiner

TRACTION BATTERY THERMAL MANAGEMENT SYSTEMS AND METHODS

TECHNICAL FIELD

The present disclosure relates to thermal management of vehicle traction batteries used to operate hybrid and electric vehicles.

BACKGROUND

Hybrid and electric vehicles commonly demand significant amounts of energy from a high voltage traction battery. The energy may be used to drive motors and electrical accessories. The traction batteries can include a large number of interconnected battery cells. Maintaining battery temperature within a desired operating range may promote proper battery function and enhance battery longevity. Also, it may be beneficial to limit the differential in temperature across individual cells. Thermal management devices may be used to regulate battery temperature. For example, directing passenger cabin air or external air across a battery may help regulate temperature. Additionally, electric heating systems may be used to warm a battery during low temperature conditions.

SUMMARY

According to aspects of the present disclosure, a battery thermal management system includes an inner housing containing a plurality of battery cells, and an outer housing enclosing the inner housing. A fluid channel is defined between an exterior surface of the inner housing and an interior surface of outer housing. The thermal management system also includes a fluid circulator in fluid flow communication with the fluid channel to selectively circulate one of a first thermal fluid and a second thermal fluid through the fluid channel.

According to other aspects of the present disclosure, a method of thermally managing a battery includes circulating a first fluid through a battery housing wall to insulate a cavity inside the housing from an exterior environment and retain heat within the cavity. The method also includes purging the first fluid from the battery housing wall, and circulating a second fluid through the battery housing wall to dissipate heat generated by a battery within the housing to the exterior environment.

According to further aspects of the present disclosure, a vehicle includes a battery housing defining a plurality of walls enclosing a plurality of battery cells. The vehicle also includes a fluid circulator in fluid flow communication with at least one wall of the battery housing. The vehicle further includes a controller programmed to selectively circulate one of a first fluid and a second fluid through the at least one wall. The first fluid is preconditioned to have a lower temperature than the second fluid.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
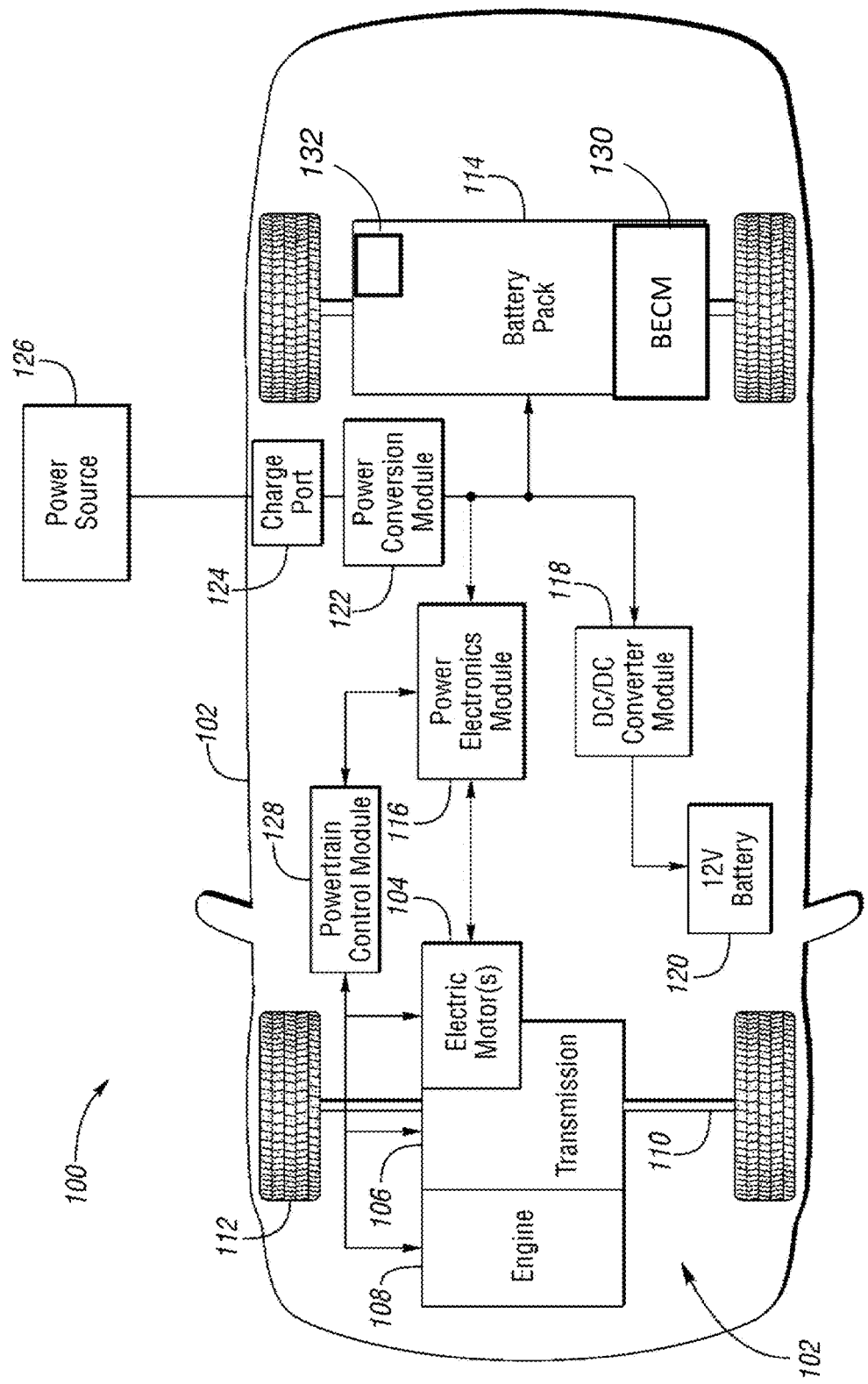
FIG. 1 is a schematic view of a hybrid-electric vehicle.

FIG. 1 depicts an example of a plug in hybrid-electric vehicle 100. A hybrid-electric powertrain 102 may include one or more electric machines, or electric motors 104 mechanically connected to a hybrid transmission 106. In addition, the hybrid transmission 106 is mechanically connected to an engine 108. The hybrid transmission 106 may also be mechanically connected to a drive shaft 110 that drives wheels 112. The electric motor(s) 104 can provide vehicle propulsion when the engine 108 is turned on, as well as when the engine is turned off. The electric motor(s) 104 can additionally provide vehicle deceleration by imparting a resistive torque upon the drive shaft. The electric motor(s) 104 may also be configured as electric generators and provide fuel economy benefits by recovering energy that would normally be lost as heat in the friction braking system. The electric motor(s) 104 may also reduce pollutant emissions since the hybrid electric vehicle 100 may be operated in an electric machine powertrain mode under certain conditions.

The traction battery, or battery pack 114, stores energy that can be used to power the electric motor(s) 104. A vehicle battery pack 114 is capable of providing a high voltage DC output. The battery pack 114 is electrically connected to a power electronics module 116. The power electronics module 116 is electrically connected to the electric motor(s) 104, and provides the ability to bi-directionally transfer energy between the battery pack 114 and the electric motor(s) 104. For example, the battery pack 114 may provide a DC voltage while the electric motor(s) 104 may require a three-phase AC current to function. In this case, the power electronics module 116 converts the DC voltage to a three-phase AC current to be received by the electric motor(s) 104. In a regenerative mode, the power electronics module 116 will convert the three-phase AC current from the electric motor(s) 104 acting as generators to the DC voltage required by the battery pack 114. The methods described herein are equally applicable to a pure electric vehicle or any other device using a battery pack.

In addition to providing battery power for propulsion, the battery pack 114 may provide energy for other vehicle electrical systems. A DC/DC converter module 118 is capable of converting the high voltage DC output of the battery pack 114 to a low voltage DC supply that is compatible with low voltage vehicle loads. Other high voltage loads, such as compressors and electric heaters, may be connected directly to the high-voltage bus from the battery pack 114. The low voltage systems may also be electrically connected to a 12V battery 120. An all-electric vehicle may have a similar architecture but without the engine 108.

The battery pack 114 may be recharged by an external power source 126. The external power source 126 may provide AC or DC power to the vehicle 100 by electrically connecting through a charge port 124. The charge port 124 may be any type of port configured to transfer power from the external power source 126 to the vehicle 100. The charge port 124 may be electrically connected to a power conversion module 122. The power conversion module may condition the power from the external power source 126 to provide the proper voltage and current levels to the battery pack 114. In some applications, the external power source 126 may be configured to provide the proper voltage and current levels to the battery pack 114 such that the power conversion module 122 may not be necessary. For example, the functions of the power conversion module 122 may be contained in the external power source 126. The vehicle powertrain including engine, transmission, electric motors, electric generators and power electronics may be controlled by a powertrain control module (PCM) 128.

A battery energy control module (BECM) 130 may be in communication with the traction battery 114. The BECM 130 may act as a controller for the traction battery 114 and may also include an electronic monitoring system that manages temperature and charge state of each of the battery cells. The traction battery 114 may have a temperature sensor 132 such as a thermistor or other temperature gauge. The temperature sensor 132 may be in communication with the BECM 130 to provide temperature data regarding the traction battery 114. Although a single temperature sensor is depicted in the schematic of FIG. 1, multiple sensors may be employed to individually monitor separate cells and/or arrays of cells within the traction battery 114.

In addition to illustrating a plug-in hybrid vehicle, FIG. 1 can be representative of a battery electric vehicle (BEV) if the engine 108 is removed. Likewise, FIG. 1 can represent a traditional hybrid electric vehicle (HEV) or a power-split hybrid electric vehicle if the components 122, 124, and 126 that are related to plug in charging are removed.

The battery cells, such as a prismatic, cylindrical, or pouch cells, may include electrochemical cells that convert stored chemical energy to electrical energy. The cells may further include a housing, a positive electrode (cathode) and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another and a busbar may assist in facilitating an electrical series connection between the multiple battery cells. The battery cells may also be arranged in parallel such that similar terminals (positive and positive or negative and negative) are adjacent to one another.

The battery cells and/or the battery electronics may generate heat during power dissipation and/or recharging. Thermal management of the traction battery may be more difficult in certain ambient conditions because the battery cells are desirably maintained within a targeted temperature range. It is further desirable to minimize the temperature deviation within each individual cell and across strings of cells. The battery cells may be thermally regulated with a thermal management system to help manage an overall temperature of the battery.

Figure 2:
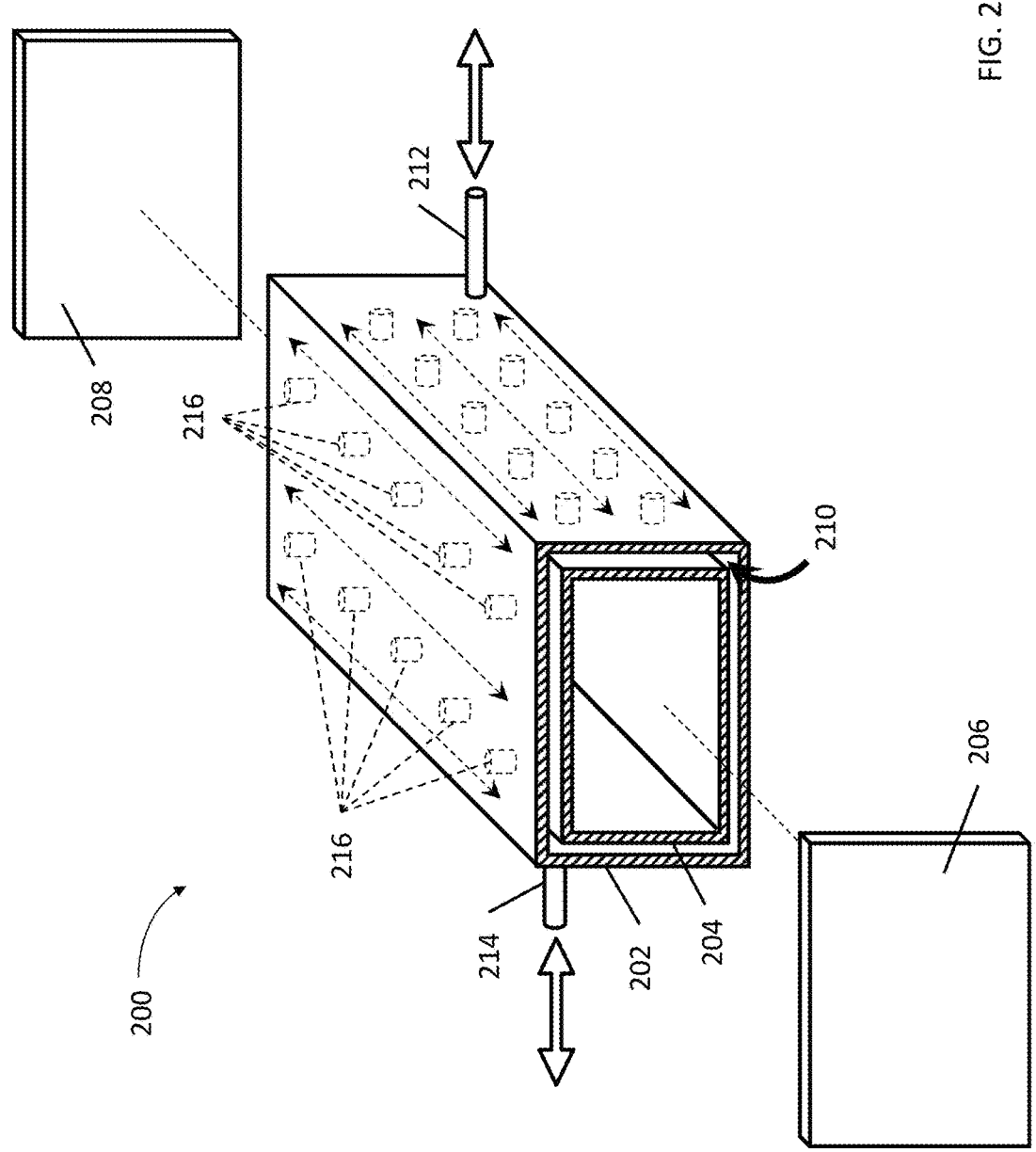
FIG. 2 is an exploded view of a traction battery housing.

Referring to FIG. 2, a battery housing 200 is depicted according to an aspect of the present disclosure. The battery housing includes an outer housing portion 202 and an inner housing portion 204. A first end cap plate 206 and a second end cap plate 208 are affixed to opposing ends of the outer housing 202 and the inner housing portion 204 to create a fluid seal. The inner housing portion 204 operates as an inner vessel to house a plurality of battery cells when sealed by the end cap plates 206, 208.

The outer housing portion encloses the inner housing portion and is spaced relative to each other. The housing portions each provide an inner layer and outer layer of the battery housing wall. The housings define a fluid channel between an interior surface of outer housing 202 and an exterior surface of the inner housing 204. The space between the outer housing portion 202 and the inner housing portion 204, or fluid channel 210, enables fluid to be selectively directed through the wall of the battery housing 200. In this way, the thermal conductivity of the walls of the battery housing 200 may be adjusted depending on the thermal needs of the battery cells.

A first inlet 212 is in fluid flow communication with the circulation channel 210 to exchange a first fluid with the channel 210. As discussed in more detail below, a fluid circulation device may be connected to the first inlet 212 to provide the first fluid to, and draw the first fluid from, the fluid circulation channel 210. According to an aspect of the present disclosure the first inlet may be connected to a pump in fluid communication with a liquid reservoir. The liquid may have a relatively high thermal conductivity such as a coolant to thermally connect the internal portions of the battery housing 200 to the external environment. More specifically, a liquid containing ethylene glycol having thermal conductivity of about 0.25 Watts/meter-Kelvin fills the circulation channel to promote heat transfer between the battery cells and the external environment. In this way heat generated by the battery cells may be dissipated to the external environment by selectively increasing the thermal conductance of the battery housing in a "conducting" mode.

A second inlet 214 may also be in fluid flow communication with the circulation channel 210 to exchange a second fluid 214. A different fluid circulation device may be connected to the second inlet 214 to provide the second fluid to, and draw the second fluid from, the circulation channel 210. According to an aspect of the present disclosure, the second inlet 214 may be connected to an air compressor to exchange air with the circulation channel 210. Air has a relatively thermal conductivity to thermally isolate the internal portions of the battery housing 200 from the external environment. Air having a thermal conductivity of about 0.024 Watts/meter-Kelvin fills the circulation channel to inhibit heat transfer between the battery cells and the external environment. In this way the battery cells may insulated from the external environment to retain heat by selectively decreasing the thermal conductance of the battery housing in an "insulating" mode.

The first and second fluids may have different densities. Therefore the location of the corresponding inlets may bear on the ability to fill and/or exhaust fluid from the circulation channel. According to an aspect of the present disclosure, second inlet that is configured to fill and exhaust air from the circulation channel is located near the upper most portion of the battery housing 200. In this way as liquid is injected from the first inlet, the air compressor can vacuum air from the top portion of the circulation cavity. The upper location is further conducive to remove any bubbles that are created by turbulence or other causes while filling the circulation channel.

The thermal conductance of the battery case can be varied to promote either cooling or warming of the battery cells as required by selectively exchanging the fluid within the wall. The fluid. In the conducting mode, the pump is used to inject a fluid, such as a glycol ethylene mixture, into the circulation channel to create a heat transfer pathway between the inner and outer layers of the battery housing walls. In one example, continuous flow of the fluid is not required once the system is charged and a valve engages to seal the system. The system could remain in this state during vehicle key-off, for example, to effectively reject the heat accumulated during an extended driving period and lower the storage temperature during parking. In the insulating mode, the fluid is removed from the circulation channel and replaced by either air or a vacuum, which both have extremely low thermal conductivity. This mode could be used if the vehicle is to be parked for extended periods at low ambient temperatures, to prevent heat loss to ambient from reducing the battery temperature to a level which degrades power delivery. The thermal resistance of the system may be altered by an order of magnitude by exchanging the fluid within the channel.

Still referring to FIG. 2, a plurality of spacer members 216 are affixed between the outer housing portion 202 and the inner housing portion 204. The spacer members 216 set the gap between the inner and outer layers of the wall of the battery housing 200. The spacers may be formed from an insulating material having a low thermal conductance relative to the outer housing portion 202 and the inner housing portion 204. Also, the spacer members 216 have a relatively small contact area between the outer housing portion 202 and the inner housing portion 204 effectively limiting conduction heat transfer through the spacers themselves. However a thermal transfer connection is significantly increased when a thermal conducting fluid is injected into the circulation channel as described above. According to an aspect of the present disclosure, the spacer members are formed from a polypropylene material and are located at regularly spaced intervals to allow fluid to pass between adjacent members.

Figure 3:
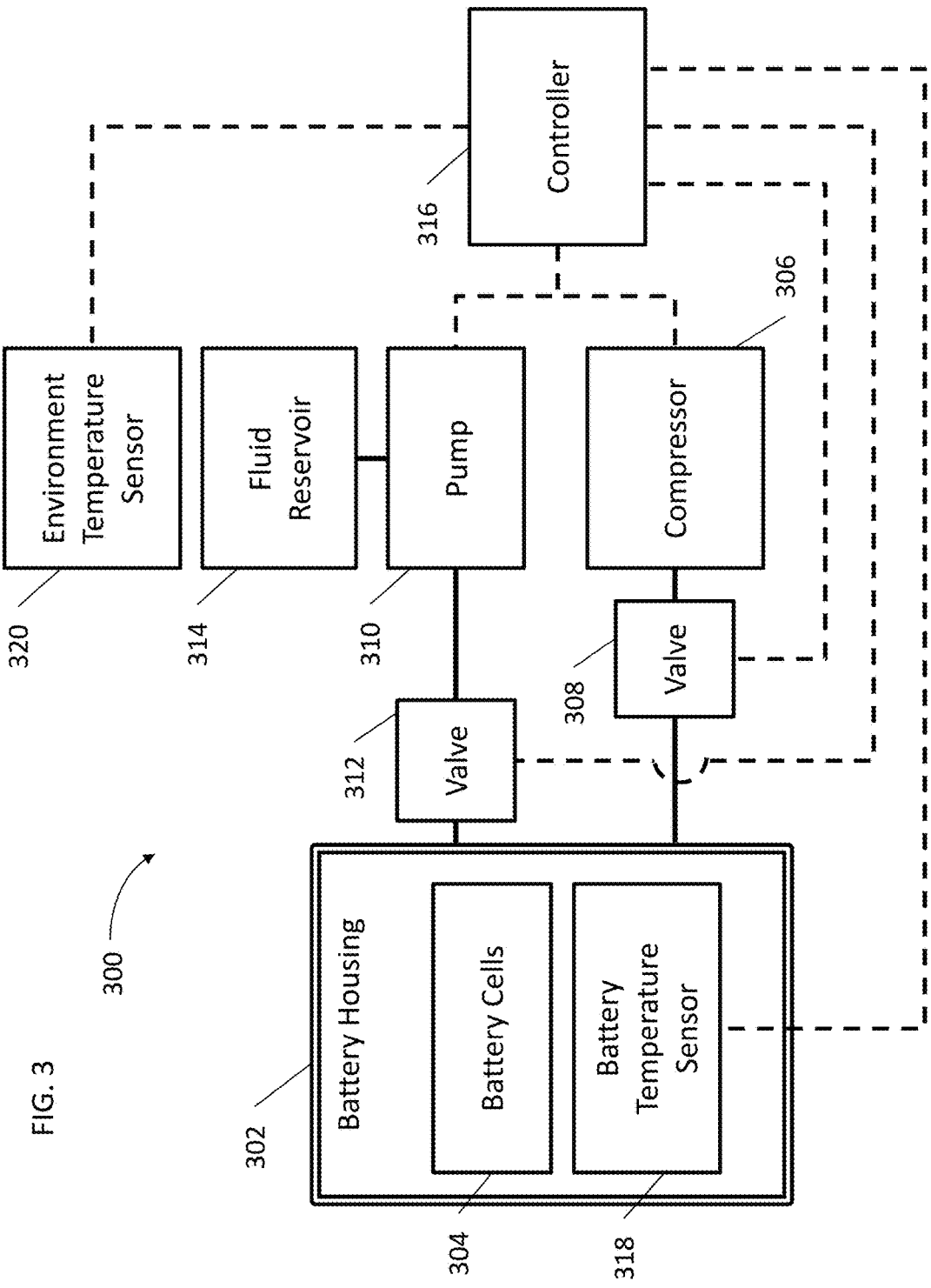
FIG. 3 is a schematic view of a traction battery thermal management system.

Referring to FIG. 3, a system diagram of a battery thermal management system 300 is depicted. A battery housing 302 contains a plurality of battery cells 304 to provide power to the electric machine for vehicle propulsion. The battery housing 302 also includes a fluid channel internal to the housing walls as discussed above. The fluid circulation channel is in fluid flow communication with an air compressor 306. A valve 308 is provided to selectively close the fluid connection between the battery housing 302 and the compressor 306. The air compressor is configured to fill and evacuate air in the circulation channel of the battery housing 302. Specifically, the air compressor 306 is capable of extracting air from the circulation channel when liquid is injected or alternatively to create a vacuum within the channel.

A pump 310 is also in fluid flow communication with the circulation channel of the battery housing 302 to inject liquid into the circulation channel. A valve 312 is provided to selectively close the fluid connection between the battery housing 302 and the pump 310. The pump 310 is also in fluid connection with a fluid reservoir 314 arranged to store fluid when not in the circulation channel.

A controller 316 is programmed to control the selective operation of the pump 310 and compressor 306. The controller 316 may monitor the temperature within the battery housing 302 and the environment external to the battery housing. The controller may be integral to the traction battery assembly, thermal management system, or be part of an external vehicle controller which regulates the battery. A battery temperature sensor 318 provides a signal to the controller 316 indicative of a temperature within the battery housing 302. Similarly, an environment temperature sensor 320 provides a signal to the controller 316 indicative of a temperature external to the battery housing 302.

The controller 316 issues commands to operate the pump 310, compressor 306, and the valves 308, 312 according to the desired thermal mode of the battery housing 302. The controller 316 determines whether to cause the battery housing 302 to enter a conducting mode or an insulating mode. According to an aspect of the present disclosure, the insulating mode is entered when the controller 316 issues commands for the valve 308 to open and for compressor 306 to force air throughout the circulation channel of the battery housing 302 to thermally insulate battery housing. More specifically, air is used to fill the circulation channel to operate as a thermal insulator between the battery cells and the environment external to the battery housing. If there is liquid within the circulation channel when entering into insulation mode, the controller issues a command to open fluid valve 312 and operate pump 310 in reverse to actively draw the fluid from the circulation channel as air is injected. The fluid pump 310 directs the fluid to the fluid reservoir 314 for storage.

According to another aspect of the present disclosure, the conducting mode is entered when the controller 316 issues commands to open the fluid valve 312 and the air valve 308 and operate pump 310 to fill the circulation channel of the battery housing 302 using fluid stored in the fluid reservoir 314. As discussed in more detail below, the fluid may be pre-cooled or pre-heated while within the fluid reservoir 314 to accelerate heat transfer through the battery housing.

Figure 4:
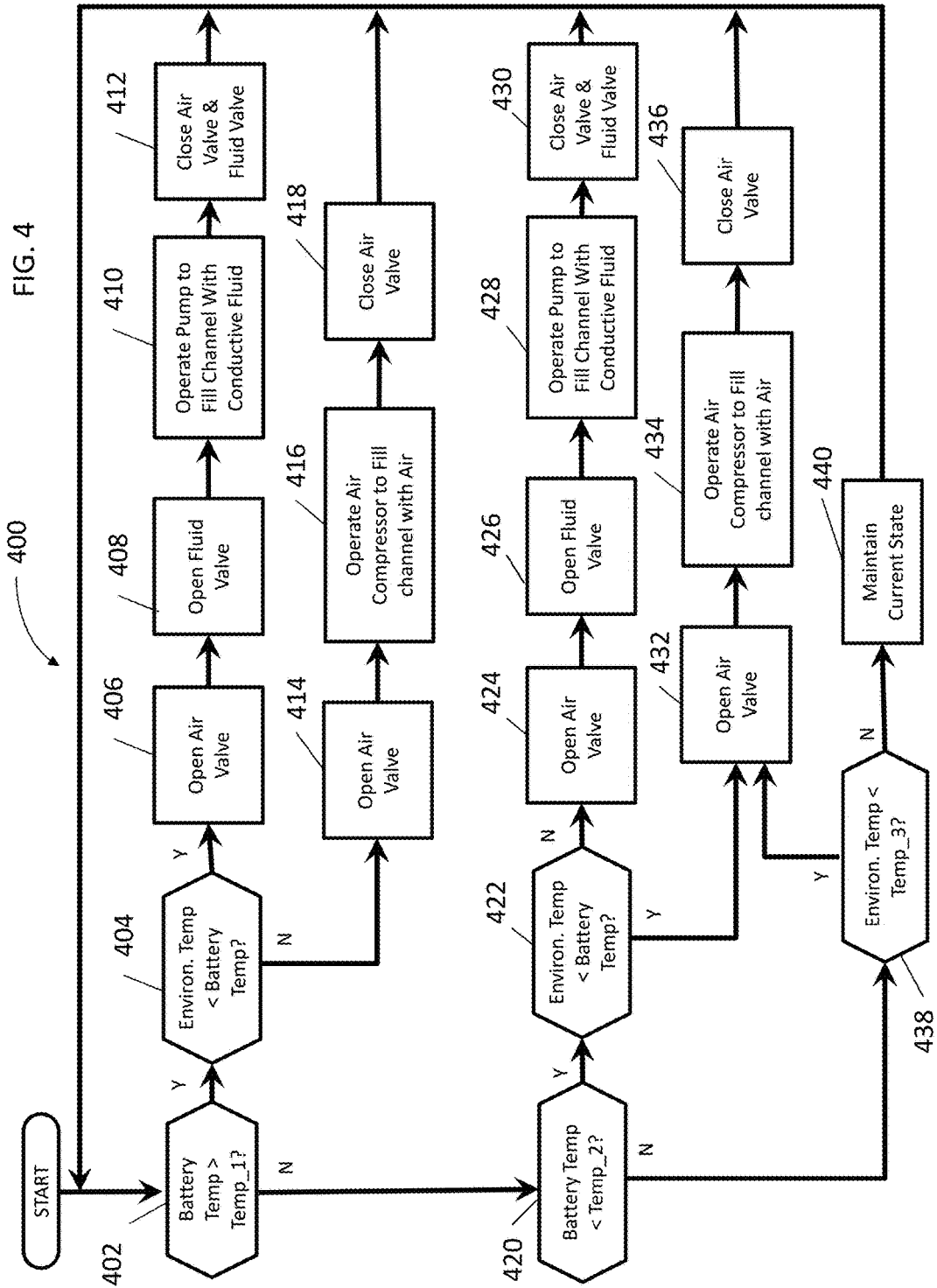
FIG. 4 is a flowchart of a method of thermally regulating a traction battery.

Referring to FIG. 4, method 400 represents an example algorithm which may be implemented to thermally manage the battery. The thermal management algorithm may be conducted at all times to maintain the battery cells in an optimal temperature range even when the vehicle is off. For example during fast charging a higher amount of energy is imparted to the battery to reduce the charging time. The higher energy input may cause the battery temperature to increase requiring cooling while the vehicle is parked and charging. In alternative embodiments, the battery case thermal mode switching algorithm may disabled when the vehicle is not running to conserve power such the current state of the battery case when the vehicle is deactivated is maintained.

The controller assesses battery conditions to determine the appropriate thermal mode for the battery housing. If at step 402 the battery temperature is sufficiently high (i.e., battery temperature greater than a temperature threshold Temp_1) it indicates a need to dissipate heat from the battery. However if the environmental temperature is greater than the battery temperature it may influence which thermal mode is most appropriate. If at step 404 the environmental temperature is less than the battery temperature, the battery housing enters conductive mode to dissipate battery heat. At step 406 controller issues a command to open the air valve to allow air to be exhausted from the circulation channel. At step 408 the fluid valve is opened to allow liquid to be injected into the circulation channel. At step 410 the pump is then operated to draw thermally conductive fluid from the reservoir to fill the circulation channel. Both of the fluid valve and the air valve are then closed at step 412 once the circulation channel is filled with the conductive fluid, also referred to as being fully charged. According to an aspect of the present disclosure, the thermal fluid is circulated in response to a battery temperature greater than a first temperature threshold.

If at step 404 the environmental temperature is greater than the battery temperature, the battery housing enters insulation mode to avoid incurring additional heat onto the battery. Other cooling mechanisms may be engaged with the battery housing in an insulation mode. At step 414 the controller issues a command to open the air valve. At step 416 the controller causes the air compressor to operating to fill the circulation channel with air. It should be appreciated that if the channel was previously filled with fluid, the fluid is exhausted when the air is forced into the channel. At step 418 the controller issues a command to close the air valve once filled with air.

If at step 402 the battery temperature is less than the temperature threshold Temp_1, the controller may assess whether the battery is sufficiently cold to indicate a need to retain battery cell heat to keep the battery in a desirable operating temperature range. If at step 420 the battery temperature is less than a temperature threshold Temp_2, the controller may invoke steps to retain battery heat. At step 422 if the environmental temperature is greater than the battery temperature conductive mode is used to increase the battery cell temperature. At step 424 the air valve is opened to allow air to be exhausted from the circulation channel. At step 426 the fluid valve is opened to allow liquid to be injected into the circulation channel. At step 428 the pump is then operated to draw thermally conductive fluid from the reservoir to fill the circulation channel. Both of the fluid valve and the air valve are then closed at step 430 once the circulation channel is fully charged with conductive fluid.

If at step 422 the environmental temperature is less than the battery temperature the controller may invoke the insulation mode in order to retain heat at the battery cells. At step 432 the air valve is opened. At step 434 the air compressor is operated to force air into the circulation channel. As discussed above, if the channel is previously holding liquid as in the conducting mode described above, the fluid valve may additionally be opened to drain the fluid from the circulation channel. The air valve is closed at step 436 once the circulation channel is substantially filled with air.

If at step 420 the battery temperature is greater than the temperature threshold Temp_2, the controller may assess the temperature of the environment external to the battery case as an indicator of upcoming battery temperature. Specifically, if the environmental temperature is less than a temperature threshold Temp_3, it indicates the need for insulation to help prevent the battery temperature from dropping further. Stated another way, it may be undesirable to be in conducting mode when the external temperature is sufficiently cold—even if the battery temperature is moderately warm. At step 438 if the temperature of the external environment is less than Temp_3, the controller may cause the battery housing to enter insulation mode and open the air valve at step 432 to fill the circulation channel with air as described above.

At step 438 if the temperature of the environment external to the battery housing is greater than the temperature threshold Temp_3, there may not be a need to actively thermally regulate the battery temperature. At step 440, the controller may allow the existing state of the battery to remain in effect not invoke a state change. The controller then returns to the beginning of method 400 to continually monitor the temperature of the battery in a looping fashion for thermal management.

Figure 5:
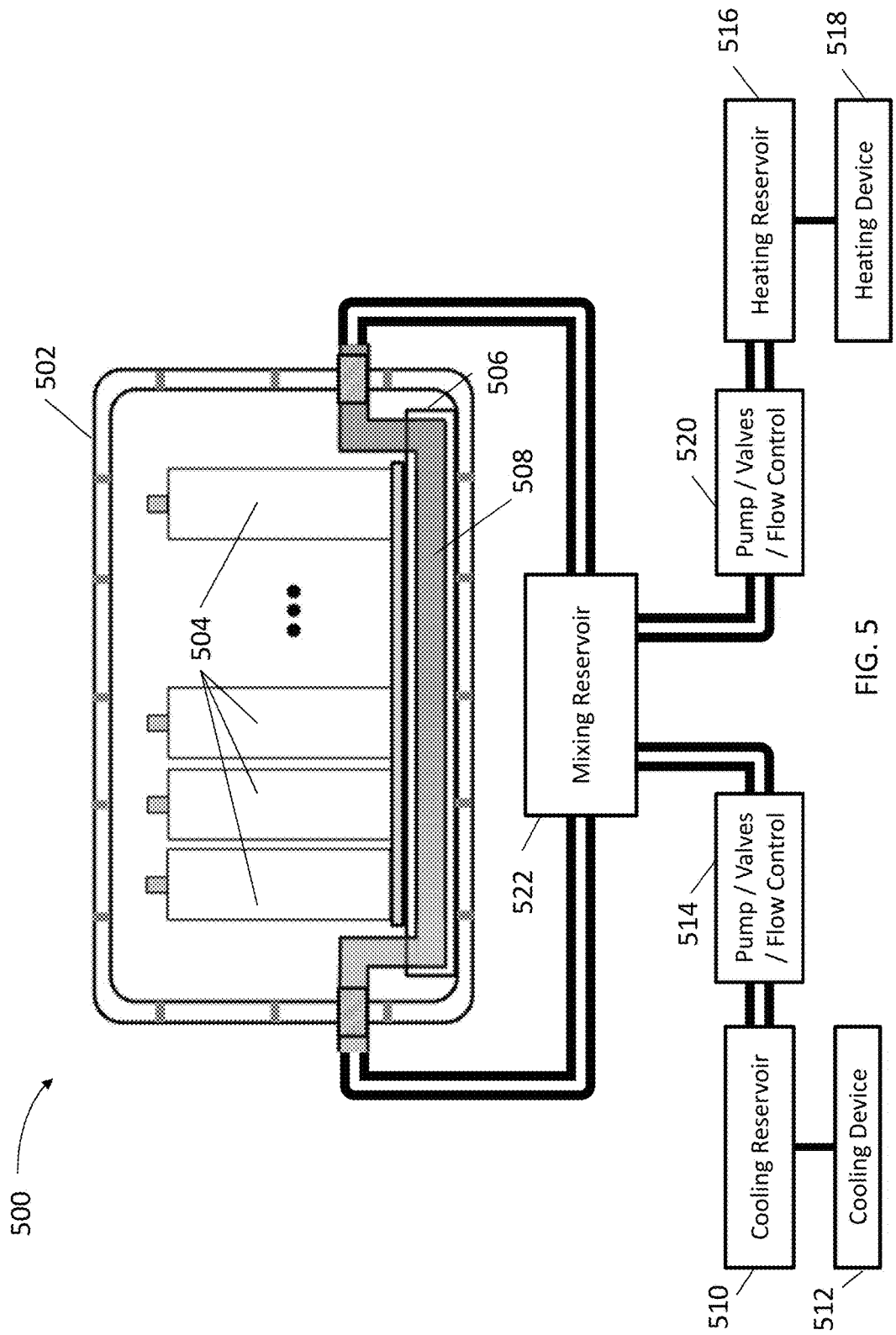
FIG. 5 is a schematic view of a multi-reservoir thermal management system.

Referring to FIG. 5, a multi-reservoir battery thermal management system 500 is schematically depicted. Similar to previous embodiments, a battery housing 502 encloses a plurality of battery cells 504. The thermal management system 500 also includes a thermal plate 506 to actively influence the temperature of the battery cells 504. The thermal plate 506 is disposed beneath the battery cells 504 and includes an internal circulation channel 508 to cycle fluids from the multiple reservoirs to influence battery temperature.

A cooling reservoir 510 is provided to store, and provide cooling to a thermal fluid. A cooling device 512 is in thermal connection with the cooling reservoir to reduce a temperature of the thermal fluid. A pump 514 is in fluid communication with the cooling reservoir 510 to cycle pre-cooled fluid into the thermal plate 506. Although referred to as a singular pump, it should be appreciated that valves or other flow control mechanisms may be used at 514 to control fluid movement to and from the cooling reservoir 510. Similarly, a heating reservoir 516 is provided to provide heating to the thermal fluid. A heating device 518 is in thermal connection with the heating reservoir 516 to increase a temperature of the thermal fluid. A pump 520 is in fluid communication with the heating reservoir to cycle pre-heated fluid into the thermal plate 506. Similarly on the heating side, a combination of a pump, valves, and/or other flow control mechanisms may be employed at 520 to regulate fluid flow to and from the heating reservoir.

Since one fluid is preconditioned to have a lower temperature than the other fluid, the pre-heated fluid and the pre-cooled fluid may be cycled into the thermal plate 506 to achieve a desired fluid temperature to influence the of the battery cell temperature. Alternatively, the fluid cooled and warmed fluids may be mixed in advance to achieve a desired fluid temperature prior to being cycled through the thermal plate 506. A mixing reservoir 522 may be provided to allow for pre-mixing of the warmed and cooled fluids to obtain an optimal fluid temperature prior to cycling through the thermal plate. Alternatively, the external mixing reservoir may be omitted and the pre-heated and pre-cooled fluids mixed directly within the thermal plate to achieve a desired fluid temperature.

The multi-reservoir thermal management system 500 may be used in conjunction with the conducting and insulating thermal modes of the battery case as discussed above. For example, when it is desirable to increase the temperature of the battery cells by cycling warmed fluid through the thermal plate, it may also be desirable to invoke the insulating mode of the battery case to retain the heat imparted to the interior of the battery case. Likewise, when it is desirable to decrease the temperature of the battery cells by cycling cooled fluid through the thermal plate, it may also be desirable to invoke the conducting mode to assist in rejecting heat from the battery case.

The present disclosure provides representative control strategies and/or logic that may be implemented using one or more processing strategies such as event-driven, interrupt-driven, multi-tasking, multi-threading, and the like. As such, various steps or functions illustrated herein may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but it is provided for ease of illustration and description.

The control logic may be implemented primarily in software executed by a microprocessor-based vehicle or battery controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While examples are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A battery thermal management system comprising:
   an inner housing containing a plurality of battery cells;
   an outer housing enclosing the inner housing;
   a fluid channel defined between the inner housing and the outer housing; and
   a fluid circulator in fluid flow communication with the fluid channel to selectively circulate one of a first thermal fluid and a second thermal fluid through the fluid channel,
   wherein the first fluid has a higher thermal conductivity than the second fluid.

2. The battery thermal management system of claim 1 further comprising a plurality of spacer members disposed in the fluid channel separating the inner housing from the outer housing, the spacer members formed from an insulating material having a lower thermal conductivity than the inner housing and the outer housing.

3. The battery thermal management system of claim 1 wherein the second fluid is air and is circulated to substantially thermally isolate the battery cells from an exterior environment and retain heat within the inner housing.

4. The battery thermal management system of claim 1 the first fluid includes ethylene glycol and is circulated to thermally connect the battery cells to an exterior environment to dissipate heat generated by the battery cells.

5. The battery thermal management system of claim 1 wherein the fluid circulator is a pump in fluid communication with at least one fluid storage reservoir.

6. The battery thermal management system of claim 1 wherein the first fluid is a pre-heated fluid and the second fluid is a pre-cooled fluid.

7. A vehicle comprising:
   a battery housing defining a plurality of walls enclosing a plurality of battery cells;
   a fluid circulator in fluid flow communication with at least one wall of the battery housing; and
   a controller programmed to selectively circulate one of a first fluid and a second fluid through the at least one wall, wherein the first fluid has first thermal conductivity being different than a second thermal conductivity of the second fluid.

8. The vehicle of claim 7 wherein the at least one wall defines an inner layer and an outer layer separated by a gap to receive fluid from the fluid circulator.

9. The vehicle of claim 8 further comprising spacer members isolating the inner layer from the outer layer.

10. The vehicle of claim 7 wherein the controller is further programmed to circulate the first fluid in response to a battery cell temperature greater than a first temperature threshold.

11. The vehicle of claim 7 further comprising a plurality of reservoirs in fluid communication with the fluid circulator, the plurality of reservoirs arranged to store the first fluid and the second fluid.

12. The vehicle of claim 7 further comprising a first reservoir in fluid communication with the fluid circulator to pre-heat the first fluid, and a second reservoir in fluid communication with the fluid circulator to pre-cool the second fluid.

13. The vehicle of claim 7 further comprising a thermal plate disposed within the battery housing to receive at least one of the first fluid and the second fluid to actively influence a temperature of the plurality of battery cells.

14. The vehicle of claim 7 wherein the first fluid has a higher thermal conductivity than the second fluid.

15. A battery thermal management system comprising:
   a housing defining a channel and containing a plurality of battery cells;
   a circulator fluidly connected with the channel to selectively circulate a first fluid during a conducting mode and circulate a second fluid different than the first fluid during an insulating mode.

16. The battery thermal management system of claim 15 wherein the first fluid has a higher thermal conductivity than the second fluid.

17. The battery thermal management system of claim 15 wherein the first fluid is a liquid coolant and the second fluid is air.

18. The battery thermal management system of claim 15 wherein the first fluid is a pre-heated fluid or a pre-cooled fluid.

19. The battery thermal management system of claim 15 further comprising a thermal plate disposed in the housing to receive at least one of the first fluid and the second fluid during at least one of the conducting and insulating modes.

* * * * *